Sept. 5, 1961  R. R. BROWN  2,998,920
AUTOMATIC AIR DAMPER POSITIONER CONTROL
FOR FUEL FIRED FURNACE Filed Sept. 26, 1957  2 Sheets-Sheet 1

INVENTOR.
Richard R. Brown
BY
J. R. Nelson &
W. A. Schaich
ATTORNEYS

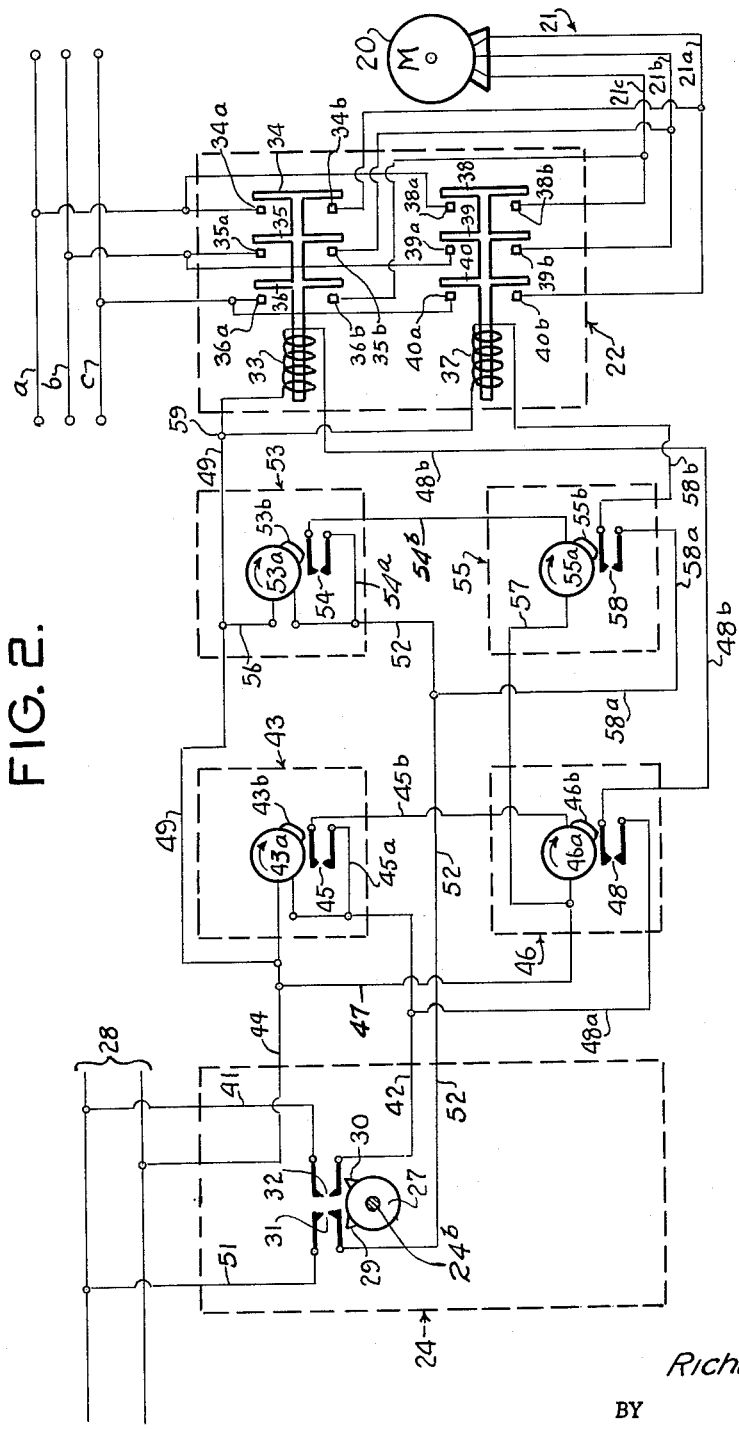

United States Patent Office 2,998,920
Patented Sept. 5, 1961

2,998,920
AUTOMATIC AIR DAMPER POSITIONER CONTROL FOR FUEL FIRED FURNACE
Richard R. Brown, Alton, Ill., assignor to Owens-Illinois Glass Company, a corporation of Ohio
Filed Sept. 26, 1957, Ser. No. 686,302
9 Claims. (Cl. 236—15)

The present invention relates to improvements in automatic air in-take damper control on a fuel fired furnace, and more particularly to an automatic control for adjusting air in-take of a furnace to hold the oxygen content in the fuel mixture being burned within a predetermined optimum range for efficient and economical combustion.

The apparatus is illustrated as applied to a regenerative type furnace that is fuel fired through side ports, the fuel being burned in a combustion chamber or tank wherein glass batch materials are melted by burning an atomized combustible fuel mixture of gas which is impingement fired in an oxygen containing atmosphere over the surface of the melt. It should be understood, however, that the invention is not limited in its use to such furnaces.

The present invention is directed at automatically regulating the oxygen content in which the fuel is burned by regulating the furnace air intake to achieve an atmosphere for conducting combustion of the fuel by maintaining a fuel-air ratio within the most efficient range for most complete and efficient combustion of the particular fuel fired. Specifically, the invention adjusts fuel-air ratio conditions in the furnace to hold a fixed oxygen content of the products of combustion being exhausted from the furnace. This measurement is made by a conventional oxygen-analysis instrument, which indicates a reading on a scale calibrated to reflect oxygen content in the exhaust gases.

It is, therefore, an object of this invention to provide an improved automatic control apparatus for regulating the air in-take damper of the furnace to maintain an optimum fuel-air ratio for combustion in the combustion chamber responsive to the oxygen-content readings of an oxygen-analysis instrument obtaining its measurements from the exhaust gases, the air in-take damper adjustments being made in such a manner as to eliminate hunting by the control to re-establish readings of oxygen analysis within the optimum range.

It is another object of the invention to regulate the fuel-air ratio in the furnace combustion chamber to maintain optimum conditions by providing improved automatic control apparatus for regulating the air in-take damper settings responsive to oxygen-content analysis of the furnace exhaust gases.

Another object of the invention is to provide the aforesaid automatic control apparatus that is operated to change furnace air in-take rate by predetermined increments of adjustment successively with a time delay between each increment and upon oxygen content of the exhaust gases being continuously maintained outside an optimum range of oxygen content quantities for a predetermined time.

Another object of the invention is to provide improved automatic control apparatus for the furnace air in-take damper operated only whenever measured oxygen content of the furnace exhaust gases reflected as readings of an analysis instrument are outside a predetermined optimum range of readings and while the readings are outside the optimum range the control is operated through a timed cycle including a timed interval after which the control makes a predetermined adjustment to the air in-take damper setting.

Other objects and advantages will appear from the following description, in conjunction with the accompanying drawings.

On the drawings:

FIG. 2 is a schematic wiring diagram of the control apparatus of this invention.

Figure 1:
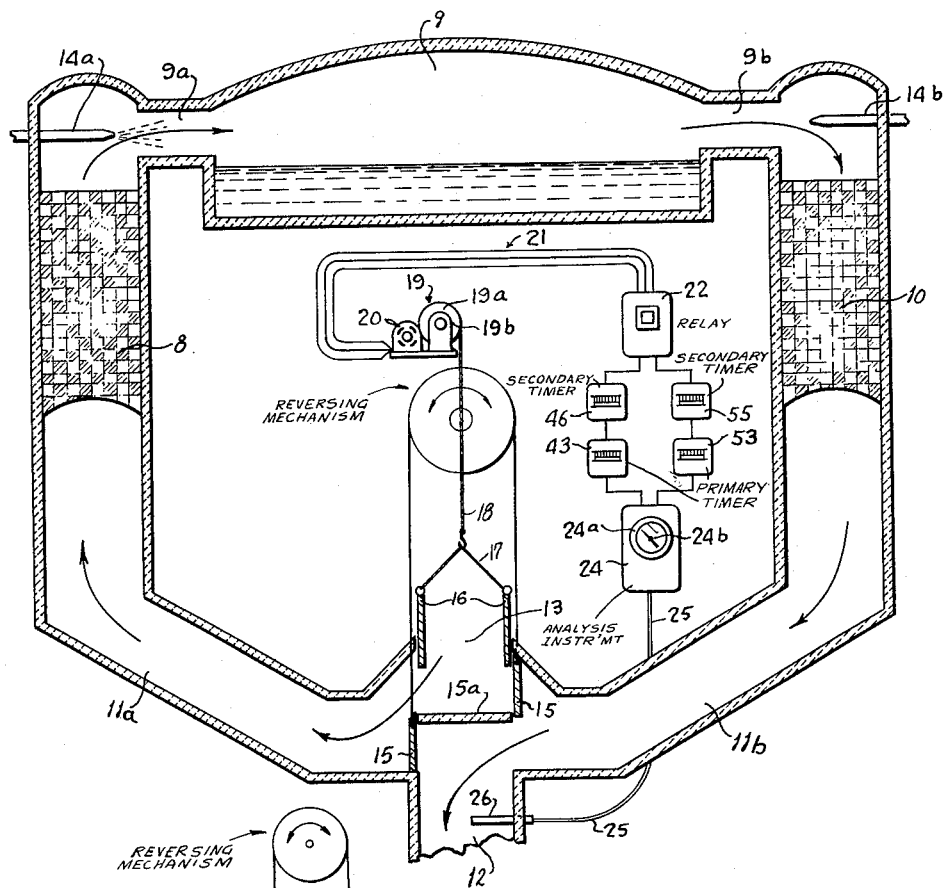
FIG. 1 is a vertical sectional elevation view of a regenerative glass melting furnace, and provided with the improved air-damper control apparatus of this invention, which is shown partly schematically.

By way of an illustrative setting to which the invention is applied, it is shown on FIG. 1, a regenerative glass furnace having checkers 8 and 10 in its side canals 11a and 11b. The canals 11a and 11b are connected to the sides of combustion chamber 9 of the furnace through side ports 9a and 9b respectively. The side canals 11a and 11b are joined and adapted to communicate with a stack canal 12. In the operation of the furnace, air is drawn in through an inlet opening 13 and into one of the side canals, such as side canal 11a, thence up through its checkers 8 which preheats this air to supply air for combustion. Fuel in the form of combustible gas is injected into the side port 9a at fuel injection nozzle 14a therein, whereupon the fuel and air mix and burn in the combustion chamber 9 of the furnace. The furnace exhaust gases are drawn out through the opposite side port 9b, thence down through checkers 10 heating them, thence through side canal 11b and into the stack canal 12. A reversing valve 15 consisting of draft reversal doors is located in the junction of the two side canals 11a and 11b and is adjustable by conventional means, such as a reversing mechanism (shown schematically on FIGS. 1 and 1A), to connect either of the side canals alternately to the air in-take opening 13 and stack canal 12. The central vane 15a of valve 15 is stationary and the side draft reversal doors 15 are vertically shiftable simultaneously by the reversing mechanism and in opposite directions to reverse the flow of air in-take and air exhaust accordingly as between side canals 11a and 11b. Mechanism (not shown) synchronized with the mechanism for reversing the doors of valve 15 is connected to supply fuel alternately to the fuel burner nozzles 14a and 14b by one of several well known devices so that fuel is supplied through the nozzle located in the particular side canal that is supplying the air intake for combustion.

Figure 1A:
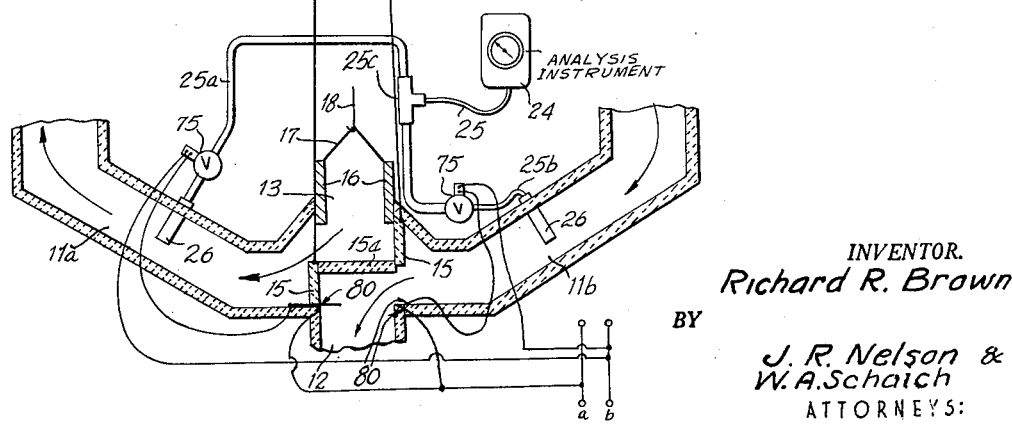
FIG. 1A is a partial sectional elevational view, like FIG. 1, showing schematically an alternative arrangement for sampling exhaust gases in a regenerative glass melting furnace.

Air in-take damper 16 is positioned in the air in-take opening 13 to regulate the volume of air being admitted to either of the side canals 11a or 11b. The air in-take damper 16 is suspended vertically by a cable support 17 connected to a cable 18 which is reeved on the winch drum 19a of a winch 19. The winch drum 19a is rotatably mounted on a shaft 19b which has a driving connection through gearing (not shown) for receiving driving rotation in either direction from a reversible electric motor 20. Motor 20 is energized through a control circuit, to be presently described, for running the motor in either direction of rotation and thereby either wind or unwind cable 18 on winch drum 19a. When winch drum 19a is driven in a counterclockwise direction of rotation as viewed on FIG. 1, the air in-take damper 16 is shifted upwardly to increase the opening of air in-take passage 13 and thereby increase volume of furnace air in-take. When driven in the opposite direction, damper 16 is shifted downwardly to decrease the opening of the air intake passageway and thereby decrease the volume of furnace air in-take. The electric motor 20 is energized through a power circuit 21. The power circuit 21 is closed by a reversible relay 22 which is capable of establishing a current polarity to the motor for energizing the motor to run in either direction. The reversible relay 22 is energized for establishing either rotation of the motor by a control circuit, including first and second energizing circuits for connecting the motor to run for, respectively, increasing and decreasing the air in-take setting of the air damper 16. These relay energizing circuits will be presently described in detail. Also included in the control circuit is an oxygen analysis instrument 24 of conventional design which is operatively connected by a conduit 25 and an element 26 shown positioned internally of the stack canal 12. As is illustrated in FIG. 1A, it may prove desirable to position a sampling element 26 in both canals 11a and 11b and connect them alternately with instrument 24 so that exhaust gases are sampled from whichever canal is connected at the time to exhaust to stack canal 12. This latter mentioned technique eliminates any chance for air leaks at damper reversing valve 15 which might effect the exhaust gas analysis. The two elements 26 are connected respectively by conduits 25a and 25b to a T-connector 25c which, in turn, has a single conduit 25 connected to the analysis instrument 24. Interposed in each of the lines 25a and 25b is a normally open, solenoid-operated valve 75. The electrical leads from each valve 75 are connected to a line power source a, b, one of these leads of each of the valves being connected through one of two normally open switches 80 that are installed in the canals 11a and 11b, respectively, and closeable by engagement by the doors of the furnace reversing valve 15. Thus, as is shown on FIG. 1A, the left-hand door of reversing valve 15 closes the corresponding switch 80 to establish the circuit for the solenoid of that valve 75 in line 25a. The right-hand switch 80 remans open. This will cause valve 75 to close line 25a and thereby disconnect the left-hand element 26 from the instrument 24. Sampling of the exhaust gases will then be continued by the right-hand element 26 in canal 11b. Upon reversal of the valve 15, the left-hand switch 80 will open and the right-hand switch 80 will close. This will automatically close the valve 75 to connect the other element 26 in canal 11a to the instrument 24. Such a connection is perhaps prefered in practice. The exhaust gases of the furnace, which ultimately pass out stack canal 12, are thereby sampled by an element 26 and analyzed by the oxygen analysis instrument 24. Readings of oxygen content in the exhaust gases are reflected as readings on the dial 24a of the instrument.

Turning now to FIG. 2, the details of the motor control will be described. The oxygen analysis instrument 24 indicates its variation in oxygen content reading of the furnace exhaust gas through rotation of the shaft 24b upon which a needle is mounted (FIG. 1). This needle shaft 24b is provided with a circular cam member 27 having spaced raised portions 29 and 30 for making contact and closing upper and lower limit switches 31 and 32 to be presently described. These raised portions of the cam 27 are located in relation to their corresponding limit switches so as to define the upper and lower limits of the optimum range of oxygen-content readings measured on the oxygen analysis instrument 24 which will correspond to the optimum operating conditions for complete and efficient combustion in the furnace. The control circuit, previously mentioned, comprises a line source of A.C. 60 cycle current, indicated at 28. The cam portions 29 and 30 are carried by the needle shaft 24b of the instrument and are capable of closing, respectively, either one of the limit switches 31 and 32, as will be presently described.

The electric motor 20 is operable in either direction of rotation depending upon the polarity of its connection to the power source by motor connecting lines 21. This is accomplished through a reversible electromagnetic relay, indicated generally at 22. A source of electric current, for example, a three phase 440 volt alternating current, for operating motor 20 is supplied through mains a, b, and c. The motor is connected in a power circuit with the electrical source by either of two separate connections through contacts being closed in the reversible relay 22, these separate connections being of opposite polarity to run the motor in opposite directions. The first connection is adapted to run the motor 20 in the direction for raising the air in-take damper position and increasing the furnace air in-take counterclockwise rotation on FIG. 1. Thus, when winding 33 is energized, contactor 34 connects main line a with line 21a of motor 20 by closing contacts 34a and 34b; contactor 35 connects main line b with line 21b of motor 20 by closing contacts 35a and 35b; and contactor 36 connects main line c with line 21c of motor 20 by closing contacts 36a and 36b. The motor 20 is thus connectable to the main line at a polarity for providing the rotation corresponding to conditions for increasing the furnace air intake.

The second connection of the electromagnetic relay 22 is adapted to run the motor 20 in the other direction for lowering the air in-take damper position and decreasing the furnace air in-take (clockwise rotation on FIG. 1). Thus, when the winding 37 is energized, contactor 38 connects main line a with line 21c of motor 20 by closing contact 38a and 38b; contactor 39 connects main line b with line 21b of motor 20 by closing contact 39a and 39b; and contactor 40 connects main line c with line 21a of motor 20 by closing contacts 40a and 40b.

The windings 33 and 37 of the electromagnetic relay 22 are each connected into individual circuits to the current line source 28, each circuit being normally open and closable by a conditioned response of the oxygen analysis instrument. The circuits are closed to energize the windings 33 or 37 responsive to certain changes of readings of the oxygen analysis instrument 24, as will be presently described.

Windings 33, when energized, close the power circuit to motor 20 to operate it for raising air in-take damper 16 and increasing furnace air in-take. Thus, when insufficient air is being supplied to the furnace for best combustion conditions, the oxygen content reading of instrument 24 will go below the lower limit of the optimum range for best combustion. In practice, an example of the upper and lower limits respectively corresponding to optimum combustion conditions in the furnace has been found in gas fired regenerative furnaces for melting glass material to correspond to readings on the scale of the oxygen analyzing instrument of from .2 of 1% oxygen content above (greater than) the median reading corresponding to optimum combustion conditions to .2 of 1% oxygen content below (less than) the median reading corresponding to optimum combustion conditions, as determined from analyzed samples of the furnace exhaust gases. Thus, oxygen content in the optimum range in the example given may vary through .4 of 1% oxygen content. The cam portions 29 and 30 on needle shaft 24b of the instrument 24 are provided to correspond respectively to these upper and lower limits of the optimum range.

When readings go below the lower limit of the range, needle shaft 24b will rotate counterclockwise and the cam portion 30 thereon will engage and close, and hold closed, limit switch 32 during the time the oxygen content readings are below the lower limit of the said range. This connects one side of the line source 28 electrically to a primary timer 43 through lines 41 and 42. The other side of the line source 28 is connected by line 44 to complete the circuit to timer 43. Timer 43 is a conventional circuit closing timer mechanism adjustable for variable time settings. When energized, its cam wheel 43a rotates clockwise, and after expiration of its timed cycle, the cam surface 43b at wheel 43a closes switch 45. The line inlet side 45a of switch 45 has a parallel connection to line 42 and the outlet side 45b of switch 45 is connected to one side of a secondary timer 46. The other side of timer 46 is connected to line source 28 by a wire connection 47 in parallel to line 44. Once switch 45 is closed by primary timer 43, the cam wheel 46a of secondary timer 46 begins a timed cycle. Timer 46 is similarly a conventional circuit closing timer mechanism adjustable for variable time settings. However, the secondary timer 46 closes a switch 48 at the beginning of its time cycle by engagement of cam surface 46b with one side of the switch 48. The line inlet side 48a of switch 48 is connected to one side of line source 28 through a parallel connection to line 42, closed limit switch 32 and line 41. The other side 48b of switch 48 is connected in circuit with windings 33 of relay 22. The other side of windings 33 is connected across the line source 28 by a connection to line 49 and line 44.

Thus, the first energizing circuit operates for energizing winding 33 of relay 22 by having first a limit switch 32 operable for closing a portion of this circuit upon the instrument 24 attaining readings below the lower limit of its established optimum range of oxygen-content readings, whereupon the primary timer 43 starts and runs through its timed cycle. It has been found that a cycle of about 1 minute on the primary timer is desirable. After timer 43 has completed its cycle, such as one minute, it closes switch 45 to start the secondary timer 46. By instituting this time lag after instrument 24 detects a need for more furnace air in-take, the control relay 22 will not yet start motor 20 to increase the air damper opening setting, so that, if the condition is only temporary, the micro-switch 32 will again open when the instrument readings again return to within the optimum range and timer 43 will drop out and be reset. This prevents over correcting or hunting for the proper air damper setting. However, if micro-switch 32 remains closed through the entire cycle of timer 43, the secondary timer 46 is started. Upon starting timer 46, it closes a switch 48 which closes the circuit to energize windings 33 of the relay control 22 and the motor 20 is thereupon started to run in a direction for increasing the air in-take setting of the air damper 16 (FIG. 1). Switch 48 remains closed and windings 33 remain energized while timer 46 is running. If, during the period of the time cycle of timer 46, or while timer 46 is running, the air intake has increased sufficiently to return the readings of instrument 24 back to within the optimum range, the micro-switch 32 will open and disconnect the circuit to de-energize windings 33 and thereby stop motor 20. However, if the air in-take is not sufficiently increased for micro-switch 32 to open, as just mentioned, timer 46 will complete its cycle during which time motor 20 will continue to run. After timer 46 has run through its cycle, the cam 46b passes beyond engagement with switch 48 to open it and disconnect the circuit to windings 33. Motor 20 will then stop. It is preferred that timer 46 be set at a time cycle which will operate motor 20 long enough to shift air damper 16 upwardly a unit of length, such as one inch. The actual time required to make such a shift in the air damper will depend upon the speed of motor 20, the driving ratio it has with the winch 19 and size of the winch drum 19a being used.

Timer 46 is provided with conventional automatic reset and it is coupled with timer 43 such that after timer 46 completes its cycle it automatically resets itself and timer 43. If micro-switch 32 still remains closed (i.e. sufficiently increased damper opening adjustment has not yet been made), the cycles of timers 43 and 46 are then repeated until the oxygen-content reading returns within optimum range and switch 32 is opened.

Thus, while the switch 32 is closed, which means the furnace is calling for more air intake, a time lag is first instituted in timer 43, then timer 46 permits an increment of adjustment on the air damper, then another time lag is instituted in timer 43 before the adjusting cycle is repeated, or until sufficient adjustment has occurred for increasing the furnace air in-take to open switch 32. By having the time lags, as mentioned, in the relay energizing circuit, the damper adjustments are made in a manner that greatly diminishes the chance for overcontrol.

Having described the first energizing circuit for one of the relay coils, namely windings 33, the second energizing circuit is correspondingly similar for energizing windings 37 upon attainment of readings of instrument 24 that exceed the upper limit of the optimum range of oxygen content readings for reflecting best furnace operation, whereupon cam 29 on the instrument needle shaft 24b engages and closes micro-switch 31. Briefly described, the second energizing circuit for the relay 22 comprises a wire connection 51 from one side of line source 28 to one side of switch 31. The other side of switch 31 is connected by line 52 to a primary timer 53, which is identical to timer 43 previously described. When timer 53 is energized, its cam wheel 53a rotates clockwise. At the end of its timed cycle, cam surface 53b closes a switch 54. The power inlet side 54a of switch 54 has a parallel connection to line 52 and its outlet wire 54b is connected to one side of a secondary timer 55. The circuit is completed to the other side of line source 28 to energize the primary timer 53 through a connection at 56 to line 49 connected to line 44. The other side of secondary timer 55 is connected to the line source 28 to energize the timer 55 by having wire 57 connected in parallel to wire 47 connected to line 44.

Once switch 54 is closed by primary timer 53, the cam wheel 55a of secondary timer 55 begins its timed cycle. The secondary timer 55 is identical to timer 46, previously described. As the cam wheel 55a of the timer 55 begins to turn, its cam surface 55b closes the switch 58. The line inlet side 58a of switch 58 is connected in parallel to line 52. The other side 58b of switch 58 is connected in circuit with one side of the windings 37 of relay 22. The opposite side of windings 37 is connected at a junction point 59 to line 49, then line 44 completing the circuit to the line source 28.

The operable time cycles of primary timer 53 and secondary timer 55 are established the same as described for the first energizing circuit. The second energizing circuit operates in a like manner as the first energizing circuit, but starts motor 20 for decreasing the air in-take setting of air damper 16 whenever the instrument readings exceed and are held above the upper limit of the optimum range of oxygen content readings measured by the instrument 24.

It is contemplated that other fuel-air measuring instruments may be used at other points in the furnace to reflect readings of fuel-air ratio instead of the aforementioned instrument which is determining fuel-air ratio by analysis of the exhaust gases; the disclosed arrangement being chosen merely as illustrating a preferred embodiment of the invention.

It will, of course, be understood that various details of construction may be modified through a wide range without departing from the principles of this invention, and

I claim:

1. In a fuel fired furnace having air inlet and exhaust passages operatively connected to a combustion chamber where a combustible mixture of fuel is burned, and in combination therewith; an oxygen recording instrument adapted to indicate readings of oxygen content of the products of combustion, air intake regulating means associated with said air inlet passage positionable for regulating the amount of air intake, a reversible motor operatively connected to said last-mentioned means for adjusting its regulating position, electro-responsive control means actuable alternatively to settings for operating said motor for either increasing or decreasing the air intake position of said regulating means, and timed means operated responsive to readings of said instrument to actuate said control means to one of its settings, comprising first and second sets of timers each consisting of a primary and a secondary timer, means operated by said instrument to maintain energized the primary timer of the first of said sets whenever readings are below the lower limit of the optimum range, means operated by this primary timer after it has been energized for a predetermined elapsed time to energize the secondary timer of the same set, means operated by this secondary timer while it is energized to actuate the control means to its setting for increasing air intake, and means operated by said instrument to maintain energized the primary timer of the second set thereof whenever the readings exceed the upper limit of the optimum range, means operated by this primary timer after it has been energized for a predetermined elapsed time to energize the secondary timer of this same set, means operated by this secondary timer while it is energized to actuate the control means to its setting for decreasing air intake.

2. The combination defined in claim 1, wherein the electro-responsive control means comprises a reversing electro-magnetic relay having two electro-magnetic coils each provided with a motor connecting device and operated thereby, the first of said coils being connected in circuit with the secondary timer of the said first set of timers and operable when energized to connect the motor through its corresponding connecting device to drive the air intake regulating means for increasing its air intake and the second of said coils being connected in circuit with the second timer of the said second set of timers and operable when energized to connect the motor through its corresponding connecting device to drive the air intake regulating means for decreasing its air intake setting.

3. The combination defined in claim 2, wherein the reversible motor is a reversible electric motor connected in a power circuit at a polarity established by energizing the first of the said coils of said reversing relay, thereby providing driving rotation for increasing the air intake, and alternatively connected in the said power circuit at an opposite polarity established by energizing the second of the said coils of said reversing relay, thereby providing driving rotation for decreasing the air intake.

4. The combination defined in claim 1, wherein the air intake regulating means comprises a draft damper door shiftable transversely into the air inlet passage, whereby to regulate the amount of air flowing in the air intake passage.

5. The combination defined in claim 1, wherein each of said means operated by the said instrument to energize, respectively, the primary timer of each of said two sets of timers comprises a pair of micro-switches operated to close responsive to position of the recording mechanism for indicating readings of said instrument, each said switch being connected individual to an electric source, and one of said micro-switches adapted to operate for closing a circuit to the primary timer of one of said timer sets upon attaining a reading of the recording mechanism below the upper limit of the optimum range of oxygen content readings, and the other of said micro-switches adapted to operate for closing a circuit to the primary timer of the other of said timer sets upon attaining a reading of said mechanism above the lower limit of the optimum range of said readings.

6. The combination defined in claim 1, wherein the furnace comprises a regenerative furnace having opposed regenerative checker brick work passageways through which combustion air is supplied and the products of combustion are withdrawn at alternate intervals, the air intake regulating means being adapted to regulate air intake in the said passageways alternately and always in the said passageway which is operating to supply combustion air to the furnace.

7. Automatic air damper control device for adjusting furnace damper openings of a regenerative furnace, and thereby regulate the fuel-air ratio of the combustible fuel mixture being burned therein, comprising a recording instrument for measuring the gases of combustion, whereby the fuel-air ratio of the fuel mixture products are determinable, said instrument adapted to indicate measurement readings which includes a range of readings corresponding to an optimum range of fuel-air ratios for the fuel mixture, reversible power means operatively connected to the said air damper for actuating it to either increase or decrease the furnace air intake, and a reversing electro-magnetic relay, when energized, being operable to connect said power means to drive in either direction, a normally open first energizing circuit for energizing said relay to connect said power means for driving in one direction to increase furnace air intake, said circuit comprising a micro-switch closable by said instrument upon attainment of a reading below the lower limit of the optimum range of said readings, a first electrically operated timer operable through a predetermined timing cycle beginning when said micro-switch is closed, a second switch in circuit and closed by said first timer only upon the completion of its timing cycle, a second electrically operated timer operable through a predetermined timing cycle upon closing of said second switch, a third switch closable by said second timer only during its timing cycle to close said energizing circuit, and a normally open second energizing circuit, corresponding to the first said energizing circuit, for energizing said relay to connect said power means for driving in the other direction to decrease furnace air intake after attainment of a reading by said instrument above the upper limit of the optimum range of readings.

8. The control device defined in claim 7, wherein each said second timers in the first and second energizing circuits are electrically connected to their corresponding first timers in their respective energizing circuits to automatically reset said first timers upon completion of their timing cycle, and further characterized by the fact that said first and second timers in each of said circuits will automatically reset whenever the micro-switch of that corresponding circuit is open.

9. In a fuel-fired regenerative glass furnace of the type described, and having opposed passages operatively connected to a combustion chamber of said furnace where a combustible mixture of fuel is burned, a reversing valve means for connecting said passages to alternately admit air by one passage and exhaust products of combustion by the opposite passage, the combination of an oxygen content analysis instrument adapted to indicate oxygen content of the exhausted products of combustion, regulating means adjustable for regulating the amount of air intake to said air admitting passage, a reversible motor operatively connected to said last-mentioned means for regulating its position, motor control means operable for energizing said motor to run in either direction, and electrically operated timing means with automatic reset connected for operation responsive to said instrument and connected to said motor control means for running said motor after the attainment of a reading of said instrument outside a predetermined optimum range of readings and after the said reading has been maintained continuously outside said optimum range for an established time duration, said timing means operating said control means continuously for a timed interval, provided, in the meantime, the instrument has not attained a reading within the said optimum range, whereby said control means, being set by said timing means, runs the motor continuously to either decrease air intake a predetermined amount while said readings remain above the upper limit of said optimum range, or increase air intake a predetermined amount while said readings remain below the lower limit of said optimum range.

References Cited in the file of this patent

UNITED STATES PATENTS

| | | |
|---|---|---|
| 1,925,880 | Paschkis | Sept. 5, 1933 |
| 2,052,375 | Wunsch et al. | Aug. 25, 1936 |
| 2,216,597 | Minneci | Oct. 1, 1940 |
| 2,762,568 | Sullivan | Sept. 11, 1956 |